May 22, 1956     E. H. PARKS     2,746,377
OUTDOOR COOKING RANGE
Filed Dec. 11, 1952     3 Sheets-Sheet 1

Ernest H. Parks
INVENTOR.

BY Clarence A. O'Brien
and Harvey B. Jacobson
Attorneys

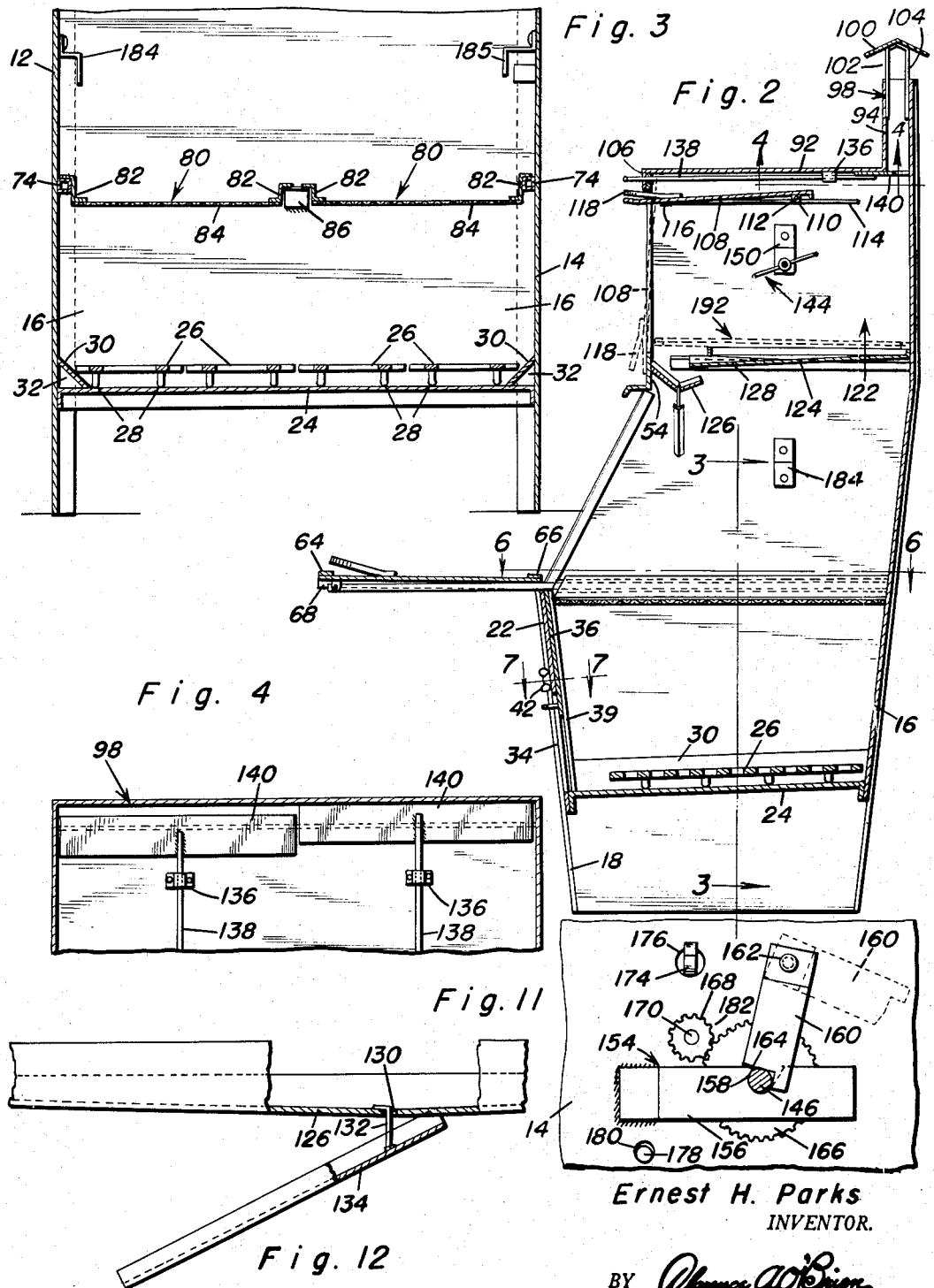

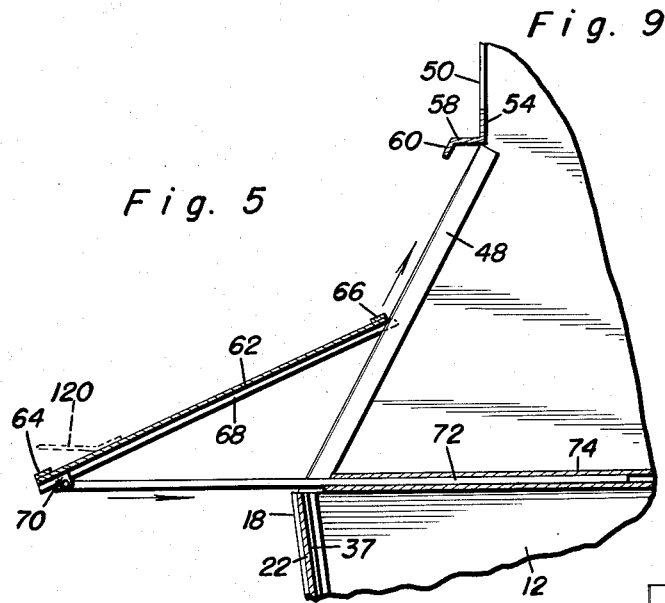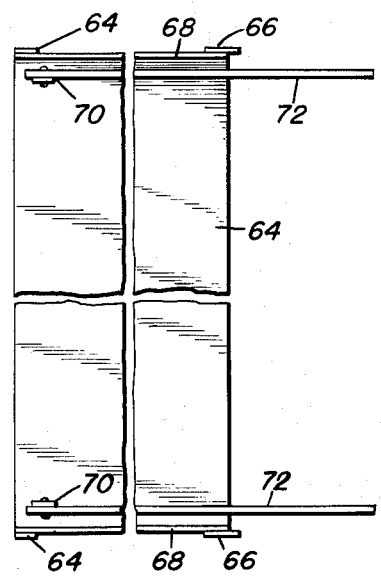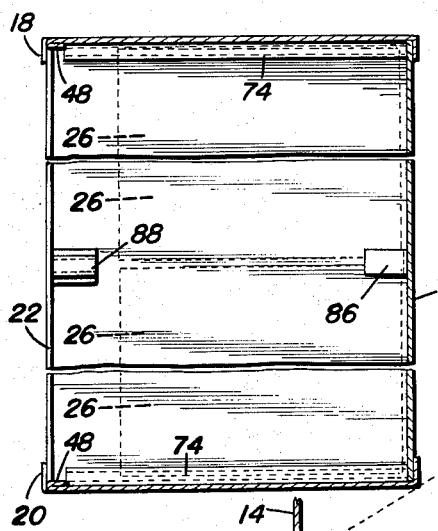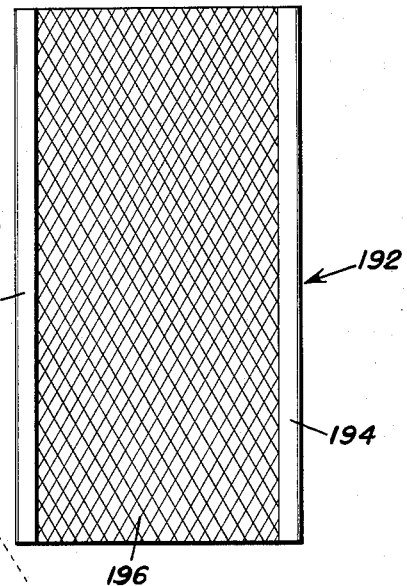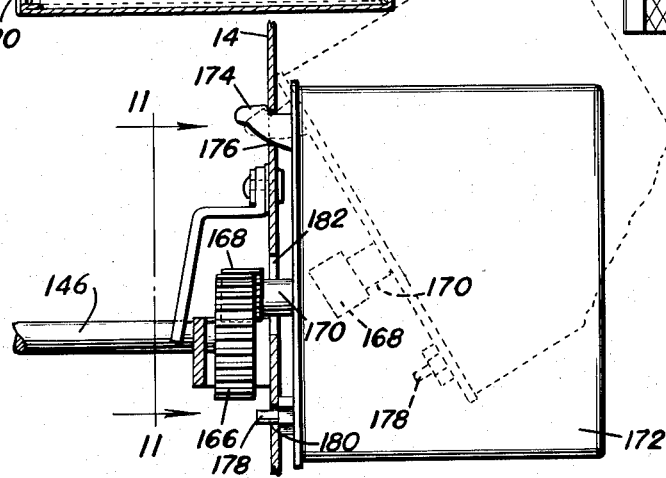

United States Patent Office 2,746,377
Patented May 22, 1956

2,746,377
OUTDOOR COOKING RANGE
Ernest H. Parks, Texarkana, Tex.
Application December 11, 1952, Serial No. 325,397
3 Claims. (Cl. 99—421)

This invention relates in general to stoves, and more specifically to an outdoor cooking range.

While there have been devised numerous types of outdoor grills, fireplaces, ranges, etc., the construction of such units is such that the same can be used successfully only in the grilling and broiling of foods. Therefore, it is the primary object of this invention to provide an improved cooking range which is expressly designed for outdoor use and which may be utilized for all types of cooking, and in which an entire meal may be cooked at one time.

Another object of this invention is to provide an improved outdoor cooking oven which includes a grill area and an oven, said cooking range being provided with a removable spit which may be selectively positioned either within the oven or within the grill area.

Another object of this invention is to provide an improved cooking range which includes a grill area to which access may be obtained through a door in the front of the range, said door being slidable and pivotable from a generally vertical position to a horizontal position whereby the same forms a shelf when open.

Another object of this invention is to provide an improved cooking range which is formed of readily shaped pieces of metal which are secured together, said cooking range being of a relatively simple design whereby the same is economically feasible.

A further object of this invention is to provide an improved cooking range which has extending upwardly therefrom a flue, means within the cooking range for controlling the passage of smoke into said flue whereby an upper portion of the cooking range may be utilized as a smoke oven.

These together with other objects and advantages which will become subsequently apparent reside in the details of construction and operation as more fully hereinafter described and claimed, reference being had to the accompanying drawings forming a part hereof, wherein like reference numerals refer to like parts throughout, and in which:

Figure 2 is a transverse vertical sectional view taken substantially upon the plane indicated by the section line 2—2 of Figure 1 and shows the general proportions of the various parts of the cooking range;

Figure 3 is a fragmentary, vertical sectional view taken substantially upon the plane indicated by the section line 3—3 of Figure 2 and shows the construction of the cooking range in the vicinity of grates thereof, and the manner in which grills are removably mounted within the cooking range;

Figure 4 is a fragmentary horizontal sectional view taken substantially upon the plane indicated by the section line 4—4 of Figure 2 and shows the arrangement of dampers for controlling the passage of smoke up into the flue of the cooking range;

Figure 5 is an enlarged fragmentary vertical sectional view through the front central portion of the cooking range and shows the exact manner in which an access door for the grill area of the cooking range is mounted;

Figure 6 is a rotated horizontal sectional view taken substantially upon the plane indicated by the section line 6—6 of Figure 2 and shows the mounting means for the removable grills, the grills and their associated door being omitted, portions of the range being omitted;

Figure 8 is a rotated top plan view of a removable grill which may be inserted in the bottom portion of the oven part of the cooking range for resting foods thereon;

Figure 9 is a rotated bottom plan view of the access door of Figure 5 and shows the support means for the same, portions of the door being omitted;

Figures 1, 7:
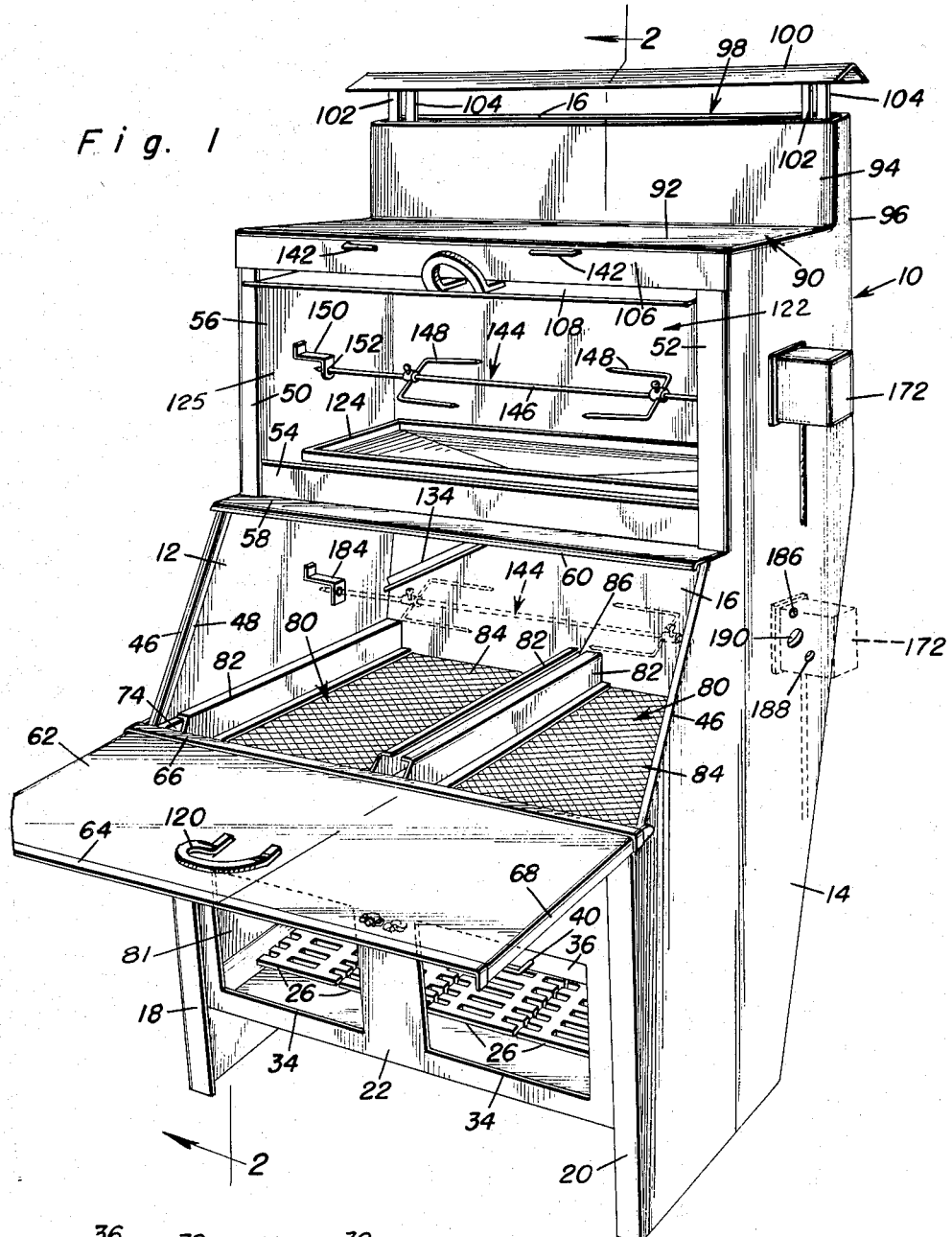
Figure 1 is a front perspective view of the cooking range, which is the subject of this invention, and shows the general appearance of the same, all of the doors of the cooking range being in their open positions.
Figure 7 is an enlarged fragmentary horizontal sectional view taken substantially upon the plane indicated by the section line 7—7 of Figure 2 and shows the manner in which draft doors are retained in vertical adjusted positions.

Figure 10 is an enlarged vertical sectional view taken through one side of the housing forming a major portion of the cooking range and shows the manner in which one end of a spit is removably secured to the side wall, also shown is the manner in which an electric motor for driving the spit is removably secured to the one side wall, the electric motor being shown in the process of being positioned in place by dotted lines;

Figure 11 is a fragmentary sectional view taken substantially upon the plane indicated by the section line 11—11 of Figure 10 and shows the exact manner in which one end of the spit is removably secured to one side wall of the cooking range, a retaining member being shown in an alternate position by dotted lines; and Figure 12 is a fragmentary vertical sectional view showing the manner in which an adjustable pouring spout is rotatably connected to an underside of a grease trough.

Referring now to the drawings in detail, it is seen that the cooking range, which is the subject of this invention, is referred to in general by the reference numeral 10. The cooking range 10 includes a pair of spaced parallel side walls 12 and 14 which are formed of sheet material. The side walls have upwardly and rearwardly sloping lower rear edge portions and vertical upper rear edge portions which are connected by a similarly formed rear wall 16.

The side walls 12 and 14 include lower vertical front edge portions which terminate in inwardly directed front flanges 18 and 20, respectively. The front flanges 18 and 20 have secured to the rear faces of the upper portions thereof a lower front wall 22. Extending between the lower edge of the front wall 22 and the lower edge of the rear wall 16, which terminate above the lower edges of the side walls 12 and 14, which form supports for the cooking range 10, is a bottom wall 24. The bottom wall 24 is intended to receive ashes and slopes downwardly and forwardly. Mounted on the bottom wall 24 is a plurality of grate section 26 on which a fire is intended to be built, the fire utilizing either wood or charcoal.

Referring now to Figure 3 in particular, it will be seen that the grate sections 26 include depending legs 28 which engage the upper surface of the bottom wall 24 to space the upper portions of the grate sections from the bottom wall. It will also be noted that the bottom wall 24 includes a downwardly directed peripheral flange along each edge thereof, the flanges engaging the inner faces of the side walls 12 and 14, the rear wall 16, and the front wall 22. The peripheral flanges of the bottom wall 24 permit the securing of the bottom wall to the surrounding walls of the cooking range. In order that burning coals may be retained on the grate sections 26, there have been provided upwardly and outwardly sloping fillets 30 which extend between the side walls 12 and 14 and the upper surface of the bottom wall 24. These fillets 30, which extend between the front and the rear of the cooking range, also function to provide dead air spaces 32 so as to insulate the side walls 12 and 14 against the heat of burning coals disposed upon the grate sections 26.

In order that fuel may be deposited upon the grate sections 26 and also to control the drafts supplied to the fire built upon the grate sections, there have been provided in the front wall 22 a pair of identical openings 34 which are selectively closed by doors 36. Disposed at the rear of the front wall 22 adjacent the outer edge of each opening 34 are suitable guide channels 37 in which the outer edges of the doors 36 are guidingly mounted for vertical movement. Also secured to the rear of the front wall 22 between the openings 34 is a member 39 bent to form oppositely facing guide channels 38 for receiving in guided relation inner edges of the doors 36.

In order that the doors 36 may be vertically positioned, there are secured to the lower portions thereof outwardly projecting handles 40 to facilitate the raising and lowering of the same. The doors 36 are retained in elevated positions by threaded locking members 42 carried by internally threaded bosses 44 secured to the outer surface of the portion of the front wall 22 disposed between the two openings 34. The threaded fasteners 42 extend through an associated portion of the front wall 22 and are adapted to clamp inner edges of the doors 36 in their respective guide channels 38.

Immediately above the upper edge of the front wall 22, the side walls 12 and 14 slope upwardly and rearwardly as at 46. The side walls 12 and 14 terminate in reversely bent flanges 48. Immediately above the upwardly and rearwardly sloping edge portions 46, the side walls 12 and 14 have vertical edge portions which terminate in front flanges 50 and 52. Secured to the rear faces of the lower portions of the front flanges 50 and 52 is a vertical flange 54 of an L-shaped member which forms a portion of the front of the cooking range 10. The upper edge of the vertical flange 54 forms a lower boundary of an enlarged opening 56 whose sides are defined by inner edges of the front flanges 50 and 52. The L-shaped front member also includes a horizontally disposed flange 58 which terminates at its forward end in a downwardly directed lip 60.

The open portion of the front of the cooking range 10 defined by the upper edge of the front wall 22, the front edge portions 46 of the side walls 12 and 14, and the horizontal flange 58, is selectively closed by a door 62. The door 62 has reversely bent front and rear edge portions 64 and 66, respectively, and has edges terminating in downwardly directed flanges 68.

Secured to the underside of the door 62, as is best illustrated in Figure 9, is a pair of depending lugs 70. The lugs 70 are in transverse alignment and are disposed inwardly of the flanges 68 and adjacent the front edge of the door 62. Pivotally secured to the lugs 70 are elongated support members 72.

Referring now to Figures 3 and 5 in particular, it will be seen that carried by the inner surfaces of the side walls 12 and 14 immediately above the upper edge of the front wall 22 are horizontally disposed tubular guide ways 74 which extend between the front and rear of the cooking range 10. Telescoped within the tubular guide ways 74 are end portions of the supports 72.

The normal position of the door 62 is substantially vertical and extending between the upper edge of the front wall 22 and the horizontal flange 58. It will be noted that the horizontal flange 58 overlies the upper edge of the door 62 when it is in its closed position, and forms both a flashing and a small shelf. When it is desired to open the door 62, the same is pulled forwardly at the bottom, with the result that the upper edge thereof moves downwardly and forwardly and its supports 72 move frontwardly relative to their respective tubular guide ways 74. If the door 62 is continued to be moved downwardly, it will assume a horizontal position supported by the supports 72. When in a horizontal position, the door 62 forms a shelf.

Disposed within the cooking range 10 adjacent the lower edge of the door 62 are grill means in the form of a pair of removable foraminous grills which are referred to in general by the reference numeral 80. The grills defining with the bottom wall 24 a lower firebox compartment 81 in the housing. Each grill 80 is formed by a pair of spaced parallel Z-shaped frame members 82 which have extending between and secured to lower flanges thereof wire mesh 84.

When the grills 80 are positioned within the cooking range 10, upper flanges of outermost Z-shaped frame members 82 thereof rest upon the tubular guide ways 74 and are supported by the same. In order that the innermost Z-shaped frame members 82 may also be supported, there is extending inwardly from the rear wall 16 a centrally disposed bracket 86. The bracket 86 underlies the upper flanges of both inner Z-shaped frame members 82. The front portions of the inner Z-shaped frame members 82 are supported by a rearwardly directed, inverted channel-shaped bracket 88 which is secured to the rear surface of the front wall 22 adjacent the upper edge thereof. The channel-shaped bracket 88 has outwardly directed, wing flanges on which the lower flanges of the Z-shaped frame members 82 disposed at the inner edges of the grills 80 are positioned.

The top of the cooking range 10 is formed by a Z-shaped top wall forming member 90. The top wall forming member 90 includes a horizontal central portion 92 which forms the top wall of the cooking range 10. The member 90 also includes a rear vertical portion 94 which is disposed adjacent to the rear wall 16 and is in spaced parallel relation thereto. The vertical portion 94, in combination with the upper portion of the rear wall 16 and upwardly directed leg portions 96 of the side walls 12 and 14 form a flue, which is referred to in general by the reference numeral 98 through which smoke passes. The flue 98 is protected against rain by a roof 100 which is disposed above the same in spaced vertical relation. The roof 100 is carried by a plurality of supports 102 and 104 which extend upwardly from the vertical portion 94 and the rear wall 16, respectively.

The member 90 also includes a vertical portion 106 which depends from the front edge of the horizontal portion 92 and is in overlapping relation to the front flanges 50 and 52 of the side walls 12 and 14, respectively. The lower edge of the vertical portion 106 forms the upper border of the opening 56.

The opening 56 has associated therewith a door 108 for selectively closing the same. While the door 108 extends vertically when it is in an opening or closing position, its open position is in a substantially horizontal plane with the door being disposed within the upper portion of the cooking range 10.

As is best illustrated in Figure 2, the door 108 has secured to the underside thereof adjacent the upper or rear edge of the same, a pair of spaced parallel lugs 110 between which extends an elongated rod 112. The rod 112 passes through the lugs 110 and rests upon elongated strips 114 secured to the inner faces of the side walls 12 and 14. The lower portion of the door 108, when the door is in its open position, also rests upon inwardly projecting portions 116 of the strips 114 which are disposed adjacent the front wall of the cooking range 10.

When it is desired to move the door 108 from a vertical position to a horizontal position, the bottom portion thereof is pulled outwardly and the same is swung about the rod 112 to a horizontal position. The door 108 is then moved rearwardly to the position illustrated in Figure 2. It will be noted that the door is provided with a horse-shoe-shaped handle 118 which facilitates the opening of the same. This handle 118 is intended to wedge below the lower edge of the lower portion 106 and limit rearward movement of the door 108.

The door 62 is provided with a similar horse-shoe-shaped handle 120. However, the handle 120 is limited in use for the movement of the door 62 between a horizontal position and a vertical position.

Dividing the upper portion of the cooking range 10 into an oven compartment, which is referred to in general by the reference numeral 122, are pans 124 and 126. The pan 124 extends forwardly from the rear wall 16 to a point closely adjacent the rear surface of the flange 54. The pan 124 has a depressed central portion which communicates with a forwardly projecting recess trough area 128 for delivering grease to the pan 126. The pans 124 and 126 define with the grills 80 a grill compartment 125 within the housing.

The pan 126 projects rearwardly from the flange 54 and partially underlies the pan 124. The overlapped portions of the pans 124 and 126 are in vertically spaced relation to permit vertically moving smoke to pass therebetween. The pan 126 immediately underlies the forward portion of the trough area 128 so as to receive grease dripping therefrom, the pan 126 functioning as a grease trough.

Referring now to Figure 12 in particular, it will be seen that the pan 126, which is V-shaped in cross-section, has formed in the bottom thereof at its apex an opening 130. Disposed within the opening 130 is an upper portion of an L-shaped fastener 132 which has secured thereto a downwardly sloping pouring spout 134. The fastener 132 permits rotation of the pouring spout 134 so that grease running through the opening 130 into the pouring spout 134 may be directed as desired. It is the intention of this invention that the pouring spout 134 direct grease downwardly into the flames of a fire burning on the grate sections 26.

In order that the oven 122 may function as a smoke oven, there is secured to the underside of the top wall 92 a pair of spaced brackets 136. Extending through the brackets 136 and supported thereby are forwardly extending control rods 138. The forward portions of the control rods 138 pass through the vertical portion 106 and are guidingly supported thereby. Secured to the rear ends of the control rods 138 are dampers 140 which are adapted to close the lower portion of the flue 98. Movement of the control rods 138 is facilitated by handles 142 formed on the forward ends thereof.

Disposed within the oven 122 is a spit which is referred to in general by the reference numeral 144. The spit 144 includes an elongated shaft 146 which has adjustably mounted thereon a pair of opposed prongs 148.

Secured to the inner surface of the side wall 12 is a Z-shaped mounting bracket 150 which has formed in an inner flange thereof an aperture 152 in which is disposed one end of the shaft 146 for rotation.

Referring now to Figures 10 and 11 in particular, it will be seen that secured to the inner surface of the side wall 14 in alignment with the mounting bracket 150 is a horizontally disposed Z-shaped mounting bracket 154. The mounting bracket 154 includes a horizontally disposed inner flange 156 which has a recess 158 in the upper edge thereof in which the opposite end portion of the shaft 146 is rotatably mounted. The shaft 146 is retained within the notch 158 by a retaining member 160 pivotally secured to the inner surface of the side wall 14 by a pivot pin 162. The retaining member 160 has a lower camming surface 164 which prevents upward movement of the shaft 146.

In order that the spit 144 may be rotated, the end of the shaft 146 adjacent the side wall 14 is provided with a gear 166, the gear 166 being disposed between the flange 156 and the side wall 14. The gear 166 is intermeshed with a gear 168 mounted on a drive shaft 170 of an electric motor 172.

The electric motor 172 is positioned externally of the cooking range 10 and is secured to the side wall 14 by an upper hook-shaped prong 174 passed through an upper opening 176 in the side wall. The electric motor 172 is retained in vertical alignment by a lower prong 178 which is disposed in a lower aperture 180 in the side wall 14. It will also be noted that the gear 168 and the drive shaft 170 pass through an enlarged opening 182 in the side wall 14 intermediate the apertures 176 and 180.

In order that the spit 144 may also be disposed above the grills 80, as is indicated in Figure 1 by dotted lines, the side wall 12 is provided with a second Z-shaped mounting bracket 184 which is identical to the Z-shaped mounting bracket 150 and is disposed vertically therebelow. It will also be understood that the side wall 14 is also provided with another Z-shaped mounting bracket 185 identical to the Z-shaped mounting bracket 154, the Z-shaped mounting bracket 185 being in horizontal alignment with the mounting bracket 184 and is intended to receive an opposite end of the shaft 146. The side wall 14 is also provided with a lower set of apertures 186, 188, and 190 which correspond to the apertures 176 and 180, and the opening 182, respectively, in order that the electric motor 172 may be properly positioned for driving the spit 144 when it is disposed immediately above the grills 80.

It will be seen that the construction of the cooking range 10 is such that any desired cooking operation may be performed thereon. If desired, foods may be broiled directly over a fire carried by the grate sections 26. Also, foods may be suitably grilled on the grills 80 and other foods may be cooked or baked within the oven 122. Also, by controlling the smoke passing through the oven 124, the foods being baked or roasted within the oven may be smoked.

By properly controlling the arrangements of the doors 36 and the dampers 140, the cooking range may be utilized to produce a maximum efficiency with the doors 62 and 108 in their closed positions. Also, the cooking range 10 may be utilized on rainy days with these doors closed.

While it is primarily intended that the oven 122 utilize the spit 144, there may be times when it is desired to rest food being roasted or baked on a suitable grill. Therefore, there has been provided a grill which is best illustrated in Figure 8 and referred to in general by reference numeral 192. The grill 192 includes spaced parallel frame members 194 which are joined together by a wire mesh 196. As is best illustrated in Figure 2, the grill 192 may be positioned immediately above the pan 124 and rested thereon, the grill being supported by that pan.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An outdoor cooking range comprising an upstanding housing including a lower firebox compartment, an intermediate grill compartment, and an upper oven compartment, grate means in said firebox compartment, draft control means providing access into said firebox compartment, horizontal foraminous grill means extending above said grate means and separating said firebox and grill compartments, vertically adjustable access door means permitting access into said grill compartment, an upwardly extending adjustable flue means communicating with said oven compartment, the bottom of said oven compartment being defined by horizontally disposed first and second drainage pans, the first pan including an edge portion overlying said second pan, said pans being vertically spaced permitting the passage of smoke from the grill compartment into said oven compartment, spit support means in said oven and grill compartments, and removable spit means for selective mounting in said grill and oven compartments.

2. An outdoor cooking range as set forth in claim 1 and the access door for the grill compartment slidable downwardly and forwardly from a substantially vertical position to a horizontal position to form a shelf.

3. An outdoor cooking range as set forth in claim 1 wherein the access door for said grill compartment is slidable downwardly and forwardly from a substantially vertical position to a horizontal position to form a shelf, elongated tubular guideways carried by oppositely disposed side wall portions of said housing, elongated support rods telescopically received in said guideways, the access door being hingedly secured at a lower edge portion thereof to the outer end of said support rods.

References Cited in the file of this patent
UNITED STATES PATENTS

| | | |
|---|---|---|
| 83,679 | Wilks | Nov. 3, 1868 |
| 366,701 | Swindell | July 19, 1887 |
| 1,010,169 | Noreck | Nov. 28, 1911 |
| 1,051,503 | Klein | Jan. 28, 1913 |
| 1,463,935 | Bond | Aug. 7, 1923 |
| 1,595,846 | Wood | Aug. 10, 1926 |
| 1,769,149 | Luther | July 1, 1930 |
| 2,110,176 | Rogers | Mar. 8, 1938 |
| 2,143,602 | Johnson | Jan. 10, 1939 |
| 2,502,685 | Warner | Apr. 4, 1950 |
| 2,558,569 | Koch | June 26, 1951 |
| 2,588,046 | Ridgely | Mar. 4, 1952 |
| 2,608,190 | Winning | Aug. 26, 1952 |
| 2,635,529 | Nisenson | Apr. 21, 1953 |